May 8, 1923.
P. L. PALMER ET AL
VALVE COCK
Filed Dec. 24, 1920
1,454,222
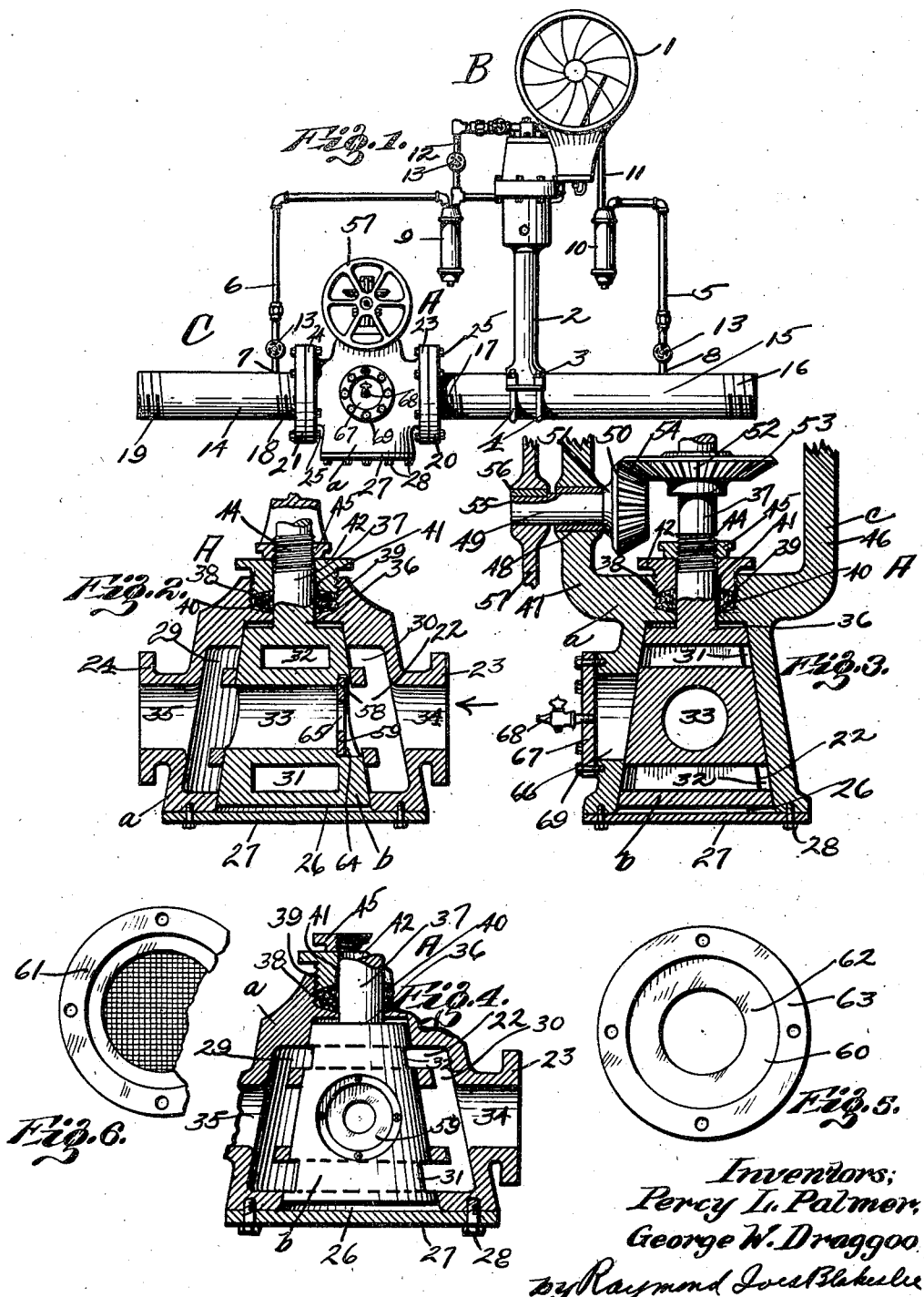
Inventors;
Percy L. Palmer,
George W. Draggoo
by Raymond Joel Blakeslee
Atty.

Patented May 8, 1923.

1,454,222

UNITED STATES PATENT OFFICE.

PERCY L. PALMER, OF REDONDO, AND GEORGE W. DRAGGOO, OF EL SEGUNDO, CALIFORNIA.

VALVE COCK.

Application filed December 24, 1920. Serial No. 432,929.

*To all whom it may concern:*

Be it known that we, PERCY L. PALMER and GEORGE W. DRAGGOO, both citizens of the United States, residing, respectively, at Redondo and El Segundo, in the county of Los Angeles and State of California, have jointly invented new and useful Improvements in Valve Cocks, of which the following is a specification.

This invention relates to valve cocks, and particularly valve cocks of the non-rising stem type. The invention has for an object the provision of a valve cock which may carry an orifice plate.

In all types of flow meters where an orifice plate or other means is utilized for recording the dynamic pressure and the static pressure of any fluid flowing through a pipe, it is necessary in the case of an orifice plate to make frequent changes of the same to vary the rate of flow of the fluid. In order to change said orifice plate and meet the condition just mentioned and at the same time not in any manner interrupt the flow of fluid passing through a pipe, it has been necessary to install what is known as a by-pass line about the meter installation. A by-pass line requires three valves, two T's, two elbows and from twelve to twenty feet of pipe. In the latter case one gate valve is attached to one side of the orifice plate, one in the middle of the by-pass line and another valve on the opposite side of the orifice plate. When the flow has been discontinued through the meter installation the flow may be continued through the by-pass line, and the orifice plate removed from the orifice meter body for change or for renewal. The present orifice valve cock was designed to relieve the necessity of providing a by-pass line, and at the same time make a change of the orifice plate within said valve an easy matter without in any manner interfering with the flow of any fluid passing through the main pipe line. The invention has for a further object the provision of an orifice cock which may carry an orifice plate, which orifice cock is so situated and constructed that the same will permit a change of the orifice plate without in any manner interfering with the flow of a fluid passing through said cock.

In practicing the invention we provide a valve body provided with a valve chamber and a plug in the form of the frustum of a cone within said valve chamber. The chambered portion of the valve body has its valve seats conforming to the shape of the plug member, and said plug member is provided with a transverse opening having a diameter similar to the internal diameter of the pipe line connecting the valve body, and likewise provided with transverse bores ranging above the first named opening and at right angles thereto. The last named transverse openings, together comprise an area equal to the center opening. Likewise the plug with its openings is so arranged that as the plug is turned the area presented by the different openings is at all times equal; thus, as the plug is completely turned 90 degrees one way or the other, the amount of fluid passing through the same is equal, and the flow of the fluid through the meter body is not affected in the least. One side of the valve body is provided with an opening in alignment with the orifice plate when the plug is rotated out of direct flow through the run. Said opening has a plate member covering the same so that the fluid content within the valve body will not escape therethrough. Thus, if any changes in the orifice plate are desired, by simply rotating the plug 90 degrees and removing the plate member covering the opening just mentioned in the valve body, the orifice plate may be removed from the plug.

The invention has for further objects the provision of an improved valve cock which will be superior, in point of relative simplicity and inexpensiveness, taken in conjunction with utility, durability and general efficiency and serviceability.

With the above mentioned and other objects in view, the invention consists in the novel and useful provision, formation, construction, combination, association and inter-relation of parts, members and features, as illustrated in some of its embodiments in the accompanying drawing, described in the following description, and finally pointed out with particularity in claims.

In the drawing:

Figure 1 is an elevation of an improved valve cock shown in connection with a pipe line and with a differential gauge having pressure connections at opposite points in said pipe line, surrounding the valve cock;

Figure 2 is a cross sectional elevation of the valve cock;

Figure 3 is a cross sectional elevation, with the valve cock rotated ninety degrees from the showing in Figure 2;

Figure 4 is a cross sectional elevation of the valve cock with the plug member rotated ninety degrees from the showing in Figure 2;

Figure 5 is a plan view of an orifice plate; and,

Figure 6 is a plan view of a strainer member which may be used in connection with certain elements of the valve cock.

Corresponding parts in all the figures are designated by the same reference characters.

Referring with particularity to the drawing A designates in its entirety the improved valve cock and B means for recording pressures, and C a main pipe line used in conducting fluids.

As stated in the preamble, the improved valve cock A may incorporate in its construction an orifice plate, which orifice plate in combination with the means B may be used in the measurement of gases or liquids in large volumes at high and low pressure flowing through the pipe C. The means B includes a differential gauge 1 suitably supported by means of a standard 2, which standard is joined with the pipe C as at 3, by means of U-shaped bolts 4 passing around said pipe and connected with flanged portions of said standard 2. Pressure connections 5 and 6 are joined to the pipe C on opposite sides of the valve cock as at 7 and 8. Said pressure connections 5 and 6 likewise include in their lengths condenser members 9 and 10 used for removing débris or foreign substances from the fluid whose static or dynamic pressure or both, are to be measured, before the said fluid is allowed to pass through pipes 11 and 12 joined with said condensers and leading to the mechanism operating the differential gauge 1. Numerous valve members 13 are included in the pressure connections and in the pipe 12 for regulation purposes. The pipe C really includes two sections as 14 and 15, the ends of each of said sections being threaded as at 16, 17, 18 and 19. The threaded ends 16 and 19 may communicate with other lengths of the main pipe line, while the threaded portions 17 and 18 have annularly flanged members 20 and 21 upon the same. Said flanged members 20 and 21 are provided with a plurality of transverse spaced perforations encircling the same and adjacent the periphery thereof. The valve cock A includes a valve body a. The valve body is chambered as at 22 and provided with two oppositely disposed annular flanged portions 23 and 24 communicating with the valve chamber 22. Said flanged portions 23 and 24 are provided with a plurality of spaced transverse perforations ranging therethrough and adapted to register with the transverse perforations in the members 20 and 21. Bolts 25 pass through said perforations for locking the valve body a to both sides 14 and 15 of the pipe line C. In detail the valve body a has its chambered portion 22 hollowed out to correspond in shape to the plug member b contained therein. Referring to Figure 3 it is noted that the plug member b is in the form of a frustum of a cone and that the chamber 22 in said figure is in the form of a hollow frustum of a cone for accommodating said plug b. The curved inner peripheral surface of the chamber 22 acts as a valve seat for the plug member b. The bottom of the valve body a as at 26 is open and a plate member 27 is detachably joined to said body member a by means of bolts 28 so as to normally close the opening 26. It is of course necessary that the valve body be constructed in the manner just stated, otherwise it would be impossible to insert the plug member b within the valve chamber 22. Referring to Figure 2 which illustrates a further detail of the valve body the valve cock is rotated ninety degrees from the showing in Figure 3. It will be noted that the chambered portion of the valve body a is enlarged as at 29 and 30.

The plug member b is provided with an upper and a lower transverse port or opening 31 and 32 and with a transverse opening or port 33 centrally located between the ports 31 and 32, and at right angles thereto. The port or opening 33 has an internal diameter equal to the internal diameter of the annular flanged members 23 and 24. The combined cross sectional area of the ports 31 and 32 are equal to the cross sectional area of the port 33. Thus if a fluid were passing through the openings 34 and 35 in the members 23 and 24 and through the opening 33 in the plug member b, a rotation of the plug member b 90 degrees from the showing in Figure 2 would permit the same amount of fluid to pass through the ports 31 and 32 as is passed through the opening or port 33. In connection with the above, it is well to state at this time that the enlarged portions 29 and 30 of the chamber 22 in the valve body a are so arranged that their cross-sectional area is in direct proportion to the cross-sectional area of the ports 31 and 32. This being the case, as the plug member b is slowly rotated the area of the port 33 gradually closes while the area of the ports 31 and 32 is gradually exposed, and the combined areas exposed equal the entire area of either the port 33 or the two ports 31 and 32. Hence, the flow of fluid through the valve body a is never interrupted.

In order to rotate the plug b, one end of the plug as at 36 is provided with a stem 37. The valve body a is provided with a circular recess 38, the inner peripheral surface of which as at 39 is threaded, and a stuffing or packing gland 40 is normally confined within said recess 38. The valve stem 37 passes upward through an opening 41 concentrically disposed within the recess 38. To retain the packing gland 40 in place, an annular flanged member 42 provided with threads 43, screws upon the threads 39. Said member 42 likewise acts as a guide for the valve stem 37. A portion of the valve stem as at 44 is threaded and a lock nut 45 is accommodated upon said portion and bears against the top surface of the member 42, thus tending to make the various parts rigid.

In Figure 3 the valve body $a$ is shown as including an integrally formed yoke member $c$. In actual practice, however, the making of a casting which would include a yoke member $c$, would be impractical, and as a matter of fact, the yoke member $c$ would be detachably joined with the body $a$. However, in the showing the yoke member $c$ includes two arms 46 and 47. The arm 47 is provided with a journaled portion 48. A shaft 49 extends through said journaled portion and carries a beveled gear 50 on an end thereof, as at 51. The valve stem likewise carries a beveled gear 52 upon the same located as at 53 and the teeth of the beveled gear 52 and the beveled gear 50 mesh with each other, as shown at 54. The opposite end of the shaft as at 55 has keyed thereto as at 56, a hand wheel 57. Thus the rotation of the hand wheel 57 rotates the beveled gears 50 and 52 and in turn rotates the stem 37 and the plug $b$. The body of the plug surrounding the port or opening 33 is annularly notched as at 58 to accommodate a member 59. Said member 59 may be an orifice plate 60 or a strainer plate 61, as illustrated in Figures 5 and 6. The orifice plate shown in Figure 5 includes an annular disc 62 held between two annular ring members 63, or the ring members may be dispensed with, if desired. In Figure 2 the ring members are not used. The orifice plate 60 is provided with a plurality of spaced transverse perforations and screws 64 pass through said perforations and have a screw-threaded engagement with a portion of the plug $b$. Thus when the plug is in the position shown in Figure 2 any fluid passing through the openings 34 and 35 will have to pass through the openings 65 in the plate 59, and thence through the opening 33. If the plug member $b$ is rotated from the position shown in Figure 2 to the position shown in Figure 4, the fluid would pass through the opening 34, through the ports 31 and 32, and thence through the opening 35, or vice versa, depending upon the direction of the flow. In the latter case, the fluid would not pass through the opening 33 nor through the plate 59. When the plug $b$ has been rotated into the position shown in Figure 4, it will be opposite a flanged opening 66 in the valve body $a$. Said flanged opening 66 is normally covered by means of a plate 67 provided with a cock 68 passing through the same and communicating with the opening 66. Said plate 67 is held to the valve body $a$ by means of screws 69 passing through transverse perforations in said plate and having a screw-threaded engagement with the body $a$. After the plug member $b$ has been properly rotated so that it is in the position shown in Figure 4, the plate member 59, which may be the orifice plate 60 or the strainer plate 61, may be removed from the plug $b$ by removing the screws 64 holding the plate 59 in position. Of course it is necessary to remove the plate member 67 in order to get to the plate 59; and before removing said plate 67, it is well to open the cock 68 to remove any fluid within the opening 66 that may be held there under pressure. The strainer member 61 shown in Figure 6 is adapted to remove foreign substances from any fluid passing through the valve. It is well to have a fluid flowing in the direction of the arrow shown at the right hand side in Figure 2 when it passes through the orifice plate 60 or strainer plate 61, for the reason that foreign substances accumulate on said plate, and the plate could easily be cleaned of said foreign substances without the necessity of removing the plate. If the flow were in the opposite direction from that shown by the arrow, it would be necessary to remove the plate because the accumulations would be within the chamber 33.

It is obvious that many changes and variations and modifications may be made in departure from the particular description and showing of the accompanying drawing, in adapting the invention to varying conditions and requirements of use and service, without departing from the true spirit of the invention.

Having thus disclosed our invention, we claim and desire to secure by Letters Patent:

1. A valve body having valve ports for induction and eduction of a fluid, a plug member seated within said valve body, said plug member being provided with a transverse port extending therethrough in line with the valve ports for induction and eduction of a fluid, said plug being provided with an annular recess portion and an orifice plate adapted to be confined within said recessed portion; said plug likewise being provided with a transverse rectangular bore at right angles to said first named port.

2. A valve body having valve ports for induction and eduction of a fluid, a plug member seated within said valve body, said plug member being provided with a transverse port extending therethrough in line with the valve ports for induction and eduction of a fluid, said plug being provided with an annular recessed portion and an orifice plate adapted to be confined within said recessed portion; said plug member likewise being provided with an upper and a lower transverse bore at right angles to said first named port.

3. A valve body having valve ports for induction and eduction of a fluid, a plug member seated within said valve body, said plug member being provided with a central transverse port extending therethrough in line with the valve ports for induction and eduction of a fluid, said plug being provided with an annular recessed portion and an orifice plate adapted to be confined within said recessed portion; said plug member likewise being provided with an upper and a lower transverse bore at right angles to said first named port; there being an operating member for rotating the plug member whereby fluid may pass through the induction port through the orifice and the central port in the plug member and through the eduction port, or upon rotation of the plug member ninety degrees the fluid may pass through the induction port through the upper and lower bores in the plug member, and thence through the eduction port.

4. A valve body having valve ports for induction and eduction of a fluid, a plug member seated within said valve body, said plug member being provided with a central transverse port extending therethrough in line with the valve ports for induction and eduction of a fluid, said plug being provided with an annular recessed portion and an orifice plate adapted to be confined within said recessed portion, said plug member likewise being provided with an upper and a lower transverse bore at right angles to said first named port; there being an operating member for rotating the plug member whereby fluid may pass through the induction port through the orifice and the central port in the plug member and through the eduction port, or upon rotation of the plug member ninety degrees the fluid may pass through the induction port through the upper and lower bores in the plug member, and thence through the eduction port; the combined cross sectional area of the upper and lower bores in the plug member being equal to the cross sectional area of the central port in said plug member.

5. A valve body having valve ports for induction and eduction of a fluid, a plug member seated within said valve body, said plug member being provided with a central transverse port extending therethrough in line with the valve ports for induction and eduction of a fluid, said plug being provided with an annular recessed portion and an orifice plate adapted to be confined within said recessed portion; said plug member likewise being provided with an upper and a lower transverse bore at right angles to said first named port; the combined cross sectional areas of the upper and lower bores in the plug member being equal to the cross sectional area of the central port, the said ports being so arranged that the amount of fluid flowing through the valve body and the ports within the plug member is the same, regardless of the position of the plug member.

6. A valve body having valve ports for induction and eduction of a fluid, a plug member seated within said valve body, said plug member being provided with a central transverse port extending therethrough in line with the valve ports for induction and eduction of a fluid, said plug being provided with an annular recessed portion and an orifice plate adapted to be confined within said recessed portion; said plug member likewise being provided with an upper and a lower transverse bore at right angles to said first named port; the combined cross sectional areas of the upper and lower bores in the plug member being equal to the cross sectional area of the central port, the said ports being so arranged that the amount of fluid flowing through the valve body and the ports within the plug member is the same, regardless of the position of the plug member; said valve body being provided with an opening communicating from the exterior to the interior of the said body, and a plate member normally closing said opening, said opening being in alignment with the central port in the plug member.

7. A valve body having valve ports for induction and eduction of a fluid, a plug member seated within said valve body, said plug member being provided with a central transverse port extending therethrough in line with the valve ports for induction and eduction of a fluid, said plug being provided with an annular recessed portion and an orifice plate adapted to be confined within said recessed portion; said plug member likewise being provided with an upper and a lower transverse bore at right angles to said first named port; the combined cross sectional areas of the upper and lower bores in the plug member being equal to the cross sectional area of the central port, the said ports being so arranged that the amount of fluid flowing through the valve body and the ports within the plug member is the same, regardless of the position of the plug member; said valve body being provided with an opening communicating from the exterior to the interior of the said body, and a plate member normally closing said opening, said opening being in alignment with the central port in the plug member; said last named opening being at right angles to the induction and eduction ports of the valve body, whereby when the plug has been rotated sufficiently the plate member covering the opening may be removed and the orifice plate detached from the plug member; said plate member likewise being provided with a pet cock transversely extending therethrough for relieving the pressure within the chamber.

8. A valve, including a valve body formed with induction and eduction ports and with a third port, a valve plug formed with two ports at angles with each other, there being an orifice plate carried by said plug in communication with one of said ports, which port is located to register with said third port when the other plug port registers with said induction and eduction ports.

9. A valve body provided with valve ports for the induction and eduction of a fluid therethrough and with a third port, a valve plug within the valve body, said plug being formed with a port, an orifice plate carried by the plug in line with said port, and a second port within said plug at an angle to said first named port, said orifice port being adapted to register with said third port when said second port registers with said induction and eduction ports.

In testimony whereof, we have signed our names to this specification in the presence of two subscribing witnesses.

PERCY L. PALMER.
GEORGE W. DRAGGOO.

Witnesses:
GURNEY T. MATTINGLY,
NEVA M. ELSEY.